United States Patent [19]
Patton et al.

[11] Patent Number: 6,008,860
[45] Date of Patent: *Dec. 28, 1999

[54] TELEVISION SYSTEM WITH PROVISIONS FOR DISPLAYING AN AUXILIARY IMAGE OF VARIABLE SIZE

[75] Inventors: Steven Wayne Patton, Fishers; Mark Francis Rumreich, Indianapolis, both of Ind.

[73] Assignee: Thomson Consumer Electronics, Inc., Indianapolis, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/581,677

[22] Filed: Dec. 29, 1995

[51] Int. Cl.[6] .............................. H04N 5/445; H04N 9/74
[52] U.S. Cl. ........................ 348/565; 348/564; 348/581
[58] Field of Search ..................... 348/565, 564, 348/567, 568, 581, 588, 584; H04N 5/445, 9/74

[56] References Cited

U.S. PATENT DOCUMENTS

| | | | |
|---|---|---|---|
| 4,238,773 | 12/1980 | Tsuboka et al. | 358/183 |
| 4,959,719 | 9/1990 | Strubbe et al. | 348/565 |
| 5,138,455 | 8/1992 | Okumura et al. | 348/565 |
| 5,251,015 | 10/1993 | Rumreich | 348/568 |
| 5,287,188 | 2/1994 | Saeger et al. | 348/565 |
| 5,422,677 | 6/1995 | Do | 348/565 |
| 5,455,632 | 10/1995 | Ichihara | 348/565 |
| 5,481,315 | 1/1996 | Matsunaga | 348/584 |
| 5,623,346 | 4/1997 | Bae | 348/565 |

FOREIGN PATENT DOCUMENTS

| | | | |
|---|---|---|---|
| 0551075 A2 | 7/1993 | European Pat. Off. | H04N 5/44 |
| 41 37 210 A1 | 5/1992 | Germany | H04N 5/45 |
| 2-82893 | 3/1990 | Japan | H04N 9/74 |
| 2151100 | 7/1985 | United Kingdom | H04N 5/265 |
| WO91/19388 | 12/1991 | WIPO | H04N 5/44 |

OTHER PUBLICATIONS

Television set, Model No. CNR–2994, manufactured by Goldstar (LG) of Korea, on sale and its associated user's manual publicly available in Korea on or about Mar. 10, 1994.

*Primary Examiner*—Nathan J. Flynn
*Assistant Examiner*—Vivck Srivnstava
*Attorney, Agent, or Firm*—Joseph S. Tripoli; Peter M. Emanuel; Frank Y. Liao

[57] ABSTRACT

In order to selectively reduce the size of an auxiliary image, such as may be displayed within main image during a so called "picture-in-picture" or "PIP" mode of operation of a television system, a fixed amount of the auxiliary image is caused to be cropped from the auxiliary image without changing the compression ratio of the compressed auxiliary video signal from which the auxiliary image is derived.

15 Claims, 4 Drawing Sheets

VIDEO, FAST SWITCH AND BORDER
INSERT SIGNALS ACROSS SAMPLE
VIDEO LINE SHOWN IN FIGURE 2

TELEVISION SYSTEM WITH PROVISIONS FOR DISPLAYING AN AUXILIARY IMAGE OF VARIABLE SIZE

FIELD OF THE INVENTION

The invention concerns a television system with provisions for displaying an auxiliary image together with a main image, and more particularly with such provisions that are capable of changing the size of the auxiliary image.

BACKGROUND OF THE INVENTION

Many modern television systems include provisions for displaying an auxiliary image corresponding to an auxiliary video signal source as well as a main image corresponding to a main video signal source. Such provisions allow a viewer to monitor one program while watching another program. The auxiliary image may be displayed within the main image in a so called "picture-in-picture" or "PIP" format. The auxiliary image may also be displayed next to the main image in a so called "picture-outside-picture" or "POP" format.

The auxiliary image is formed by converting the analog video signal from the auxiliary signal source to a digital video signal, "subsampling" the digital video signal by eliminating pixel samples and lines from the digital video signal, storing the resulting compressed digital video signal in a memory, and retrieving the stored digital from the memory in synchronism with the horizontal and vertical synchronizing components of the video signal from the main video signal source. A so-called "antialiasing" filter is utilized to reduce the bandwidth of the digital signal before compression to avoid artifacts in the auxiliary image due to the subsampling process. The digital signal retrieved from the memory is converted to an analog video signal and the resultant analog video signal corresponding to the auxiliary image is combined with the analog signal corresponding to the main image to form a combined analog video signal. The combined analog video signal is coupled to a display device. The combining operation is performed by a switching section or "multiplexer" which selectively decouples the main video signal from the display device and instead couples the auxiliary video signal to the display device during predetermined portions of predetermined horizontal scanning lines of the main video signal.

The auxiliary image is usually considerably smaller than the main image. For example, the auxiliary image may be one-third the size of the main image. However, it may be desirable to be able to selectively reduce the size of the auxiliary image still further, for example, from one-third size to one-fourth size, so that the auxiliary image does not obscure the main image. One way of accomplishing this is to change the compression ratio of the auxiliary image. However, this requires relatively extensive and complicated circuitry for changing the subsampling ratio and the associated anti-aliasing filtering, and changing the management of the memory for storing of the subsampled digital signal. Moreover, the additional compression tends to make details of the auxiliary image and text and graphics inserted within the auxiliary image harder to see.

SUMMARY OF THE INVENTION

In accordance with the invention, in order to selectively reduce the size of an auxiliary image, a fixed amount of the auxiliary image is caused to be cropped from the auxiliary image without changing the compression ratio of the compressed auxiliary video signal from which the auxiliary image is derived.

BRIEF DESCRIPTION OF THE DRAWING

An embodiment of the invention will be described with reference to the accompanying Drawing, in which.

DETAILED DESCRIPTION OF AN EMBODIMENT OF THE INVENTION

Figure 1A:
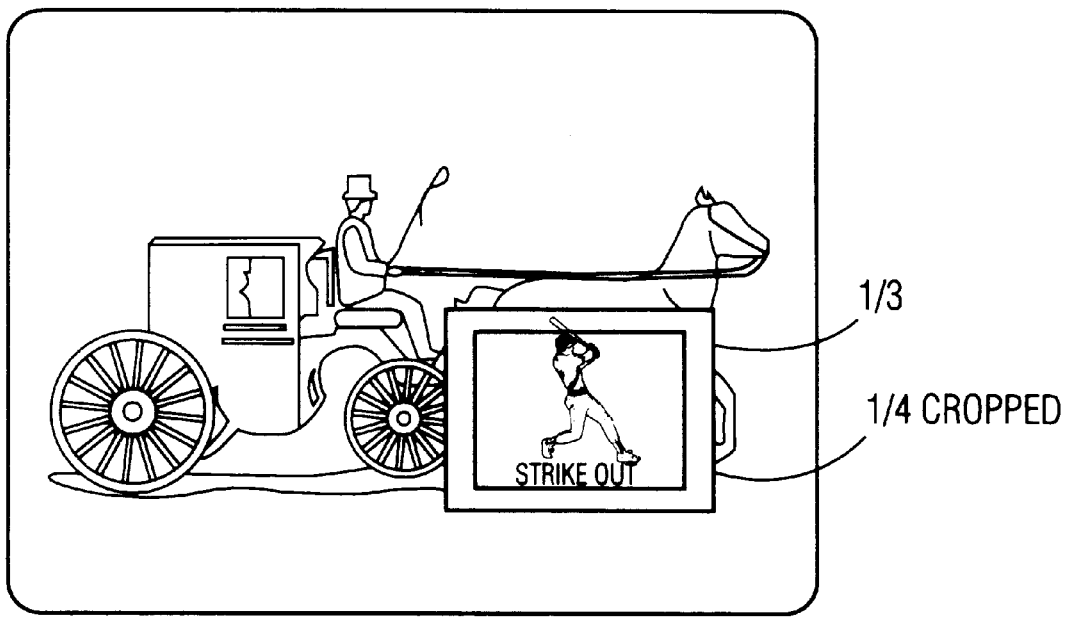
FIGS. 1A and 1B show the screen of a television system during various PIP modes of operation.
Figure 1B:
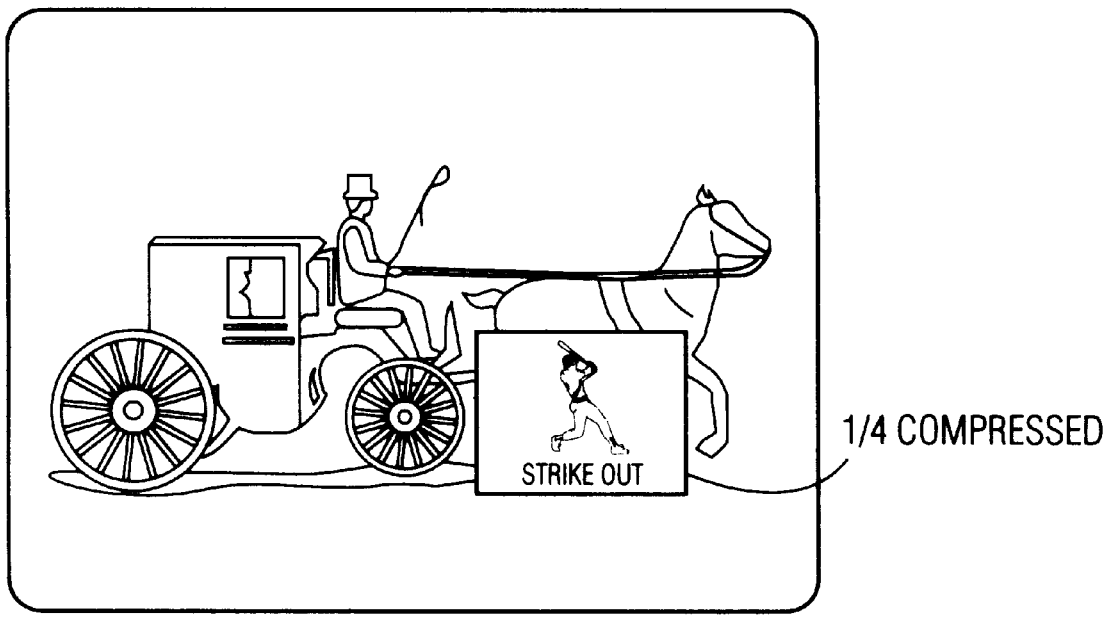

FIG. 1A shows screen of a typical 4 by 3 aspect ratio television receiver with a relatively small auxiliary image corresponding to a video compression ratio 1/3 inserted within a full size main image during a PIP mode of operation. The 1/3 size auxiliary image tends to obscure the main image. Therefore, it is desirable to be able for the user to selectively cause the size of the auxiliary image to be reduced, for example, to a 1/4 size auxiliary image. FIG. 1B indicates what occurs if the size reduction is accomplished by increasing the video compression ratio to 1/4. While more of the main image is made visible, the auxiliary image has been compressed to the point at which details in the auxiliary image are less visible. In addition, any text or graphics which has been inserted in the auxiliary image at the studio, such as closed caption text, or text which has been inserted in the receiver itself, such as channel numbers, becomes significantly less visible.

In accordance with the invention, the size reduction of the auxiliary image is produced by cropping a predetermined portion of the original auxiliary image without changing the video compression ratio. The result is indicated in FIG. 1A by the 1/4 size auxiliary image labeled "1/4 cropped". More of the main image is visible because of the size reduction. While some of the auxiliary image has been lost, image details and text or graphics are still relatively visible because the image has not been compressed.

In addition, the circuitry required to reduce the size of an auxiliary image when the cropping method is employed is far less complicated than that required when the compression method is employed. The latter requires a considerable amount of complicated circuitry for changing the compression subsampling ratio and the associated anti-aliasing filtering, and the management of the memory for storing of the subsampled digital signal. The structural aspects of the invention will now be described with reference to FIG. 2.

Figure 2:
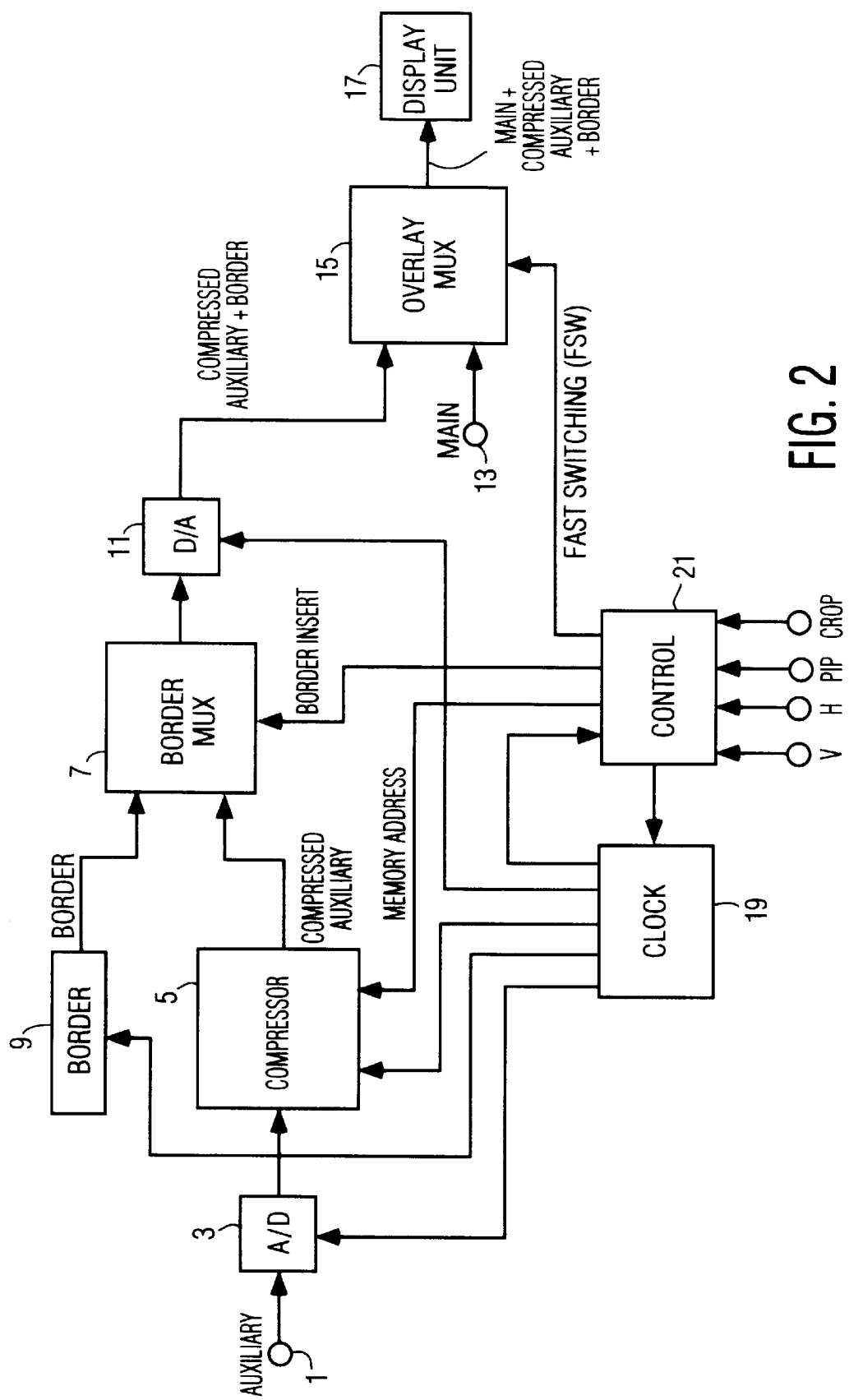
FIG. 2 shows a block diagram of a television system with a PIP processing section constructed in accordance with the invention.

Briefly, in the PIP processing section of the television system shown in FIG. 2, a composite video signal corresponding to the auxiliary image, containing a luminance component and a chrominance component, is processed to form baseband components, such as a luminance signal and two color difference signals or three color difference signals.

Each component signal is compressed, synchronized with the video signal corresponding to the main image and combined with a corresponding component of the main video signal to form a combined component signal. The combined component signals are coupled to a display device, such a picture tube. Since the PIP processing channels for the various components are similar, at least with respect to the present invention, only one PIP processing channel is shown in FIG. 2. In the following description, the terms "auxiliary video signal" and "main video signal" correspond to one of the component signals.

As is shown in FIG. 2, the analog auxiliary video signal received at an input terminal 1 is converted to a digital video signal by a digital-to-analog converter 3. The digital auxiliary video signal is subsampled in a compression unit 5 to remove a predetermined number of lines and predetermined number of pixels per line. Compression unit 5 includes an anti-aliasing filter for reducing the bandwidth of the auxiliary video signal prior to subsampling to reduce artifacts in the reproduced auxiliary image due to the subsampling process. The compressed auxiliary video signal is stored in ("written-into") a memory also included in compression unit 5 and retrieved from ("read-out") of the memory in synchronism with the vertical and horizontal synchronization components of the main video signal. The digital video signal which has been read-out of the memory of compressor 5 is coupled to a digital multiplexer ("MUX") or switch 7. The function of multiplexer 7 and an associated "border" unit 9 will be described below. For the moment, assume that multiplexer 7 couples the digital video signal which has been read-out of the memory to a digital-to-analog converter 11. Digital-to-analog converter 11 converts the digital video signal into an analog signal. The resultant compressed auxiliary analog signal is combined with the main analog video signal, which is received at a terminal 13, by an analog multiplexer or switch 15. The resultant combined video signal is coupled to a display device 17, where a picture including an auxiliary image within a main image is displayed.

A clock unit 19 generates clock signal for various portions of the PIP processing section and a control unit 21 generates various control signals for the PIP processing unit. Control unit 21 is responsive to horizontal (H) and vertical (V) synchronization components of the main video signal and to user initiated PIP and CROP command signals. The PIP command signal initiates the PIP operating mode. The CROP command signal initiates the cropping operation by which the size of the auxiliary image is reduced.

Multiplexer 15 is operated in response to a switching control signal to replace the main video signal with the compressed auxiliary signal at the desired location of the auxiliary image. Multiplexer 15 may be called an "overlay" switch" because it combines the compressed auxiliary video signal and the main video signals (even though it replaces one signal with the other). The switching control signal for multiplexer 15 may be called a "fast switching" or "FSW" control signal because of the speed at which multiplexer 15 operates.

Figure 4:
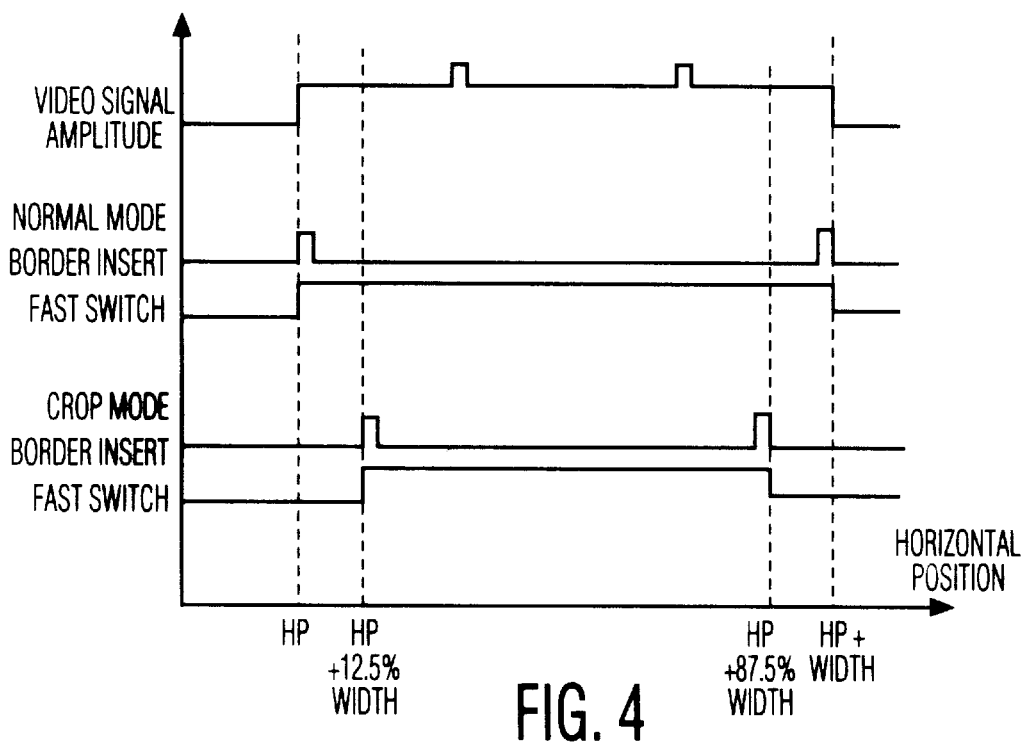
FIG. 4 shows various signal waveforms also indicating the manner in which the size of an auxiliary image can be reduced in accordance with the invention.

More specifically, multiplexer 15 is operated to replace the main video signal with the auxiliary video signal during a predetermined portion of each field, starting at predetermined horizontal line corresponding to the top edge of the auxiliary image and ending at another predetermined line corresponding to the bottom edge of the auxiliary image, and during a predetermined portion of each horizontal scanning line within the predetermined portion of each field, starting with a predetermined pixel corresponding to the location of the left edge of the auxiliary image and ending with another predetermined pixel corresponding to the location of the right edge of the auxiliary image. This operation is indicated in FIG. 4. The contents of the memory of compression unit 5 are read-out during the time intervals in which the main video signal is being replaced with the auxiliary video signal in response to address signals.

Multiplexer 7 and associated "border" unit 9 and provide a border for the auxiliary image. Border unit 9 is a register which stores a digital value corresponding the shade of the border in the case of the luminance signal component, and a color level in the case of the color components. If only a gray-scale border is desired, the digital border values for the color components may correspond to blanking level. Multiplexer 7 is operated in response to a switching control signal to decouple the output signal of compressor unit 5 from digital-to-analog converter 11 and replace it with the digital border value at the desired location of the border. Multiplexer 7 serves to combine the compressed auxiliary video signal with a signal representing its border. Accordingly, multiplexer 7 may be called a "border insert" switch and its switching control signal may be called a "BORDER INSERT" switching control signal.

More specifically with regard to the generation of the border, during a predetermined number (e.g., three) of horizontal lines above the top edge of the auxiliary image, border insert multiplexer 7 is caused to couple the border value provided by border unit 9 to digital-to-analog converter 11 for a predetermined portion of each of the lines corresponding to the width of the auxiliary image plus the widths (e.g., three pixels) of the left and right sides of the border. This causes the top side of the border to be formed. During each of the predetermined number of horizontal lines corresponding to the height of the auxiliary image, border insert multiplexer 7 is caused to couple the border value to the digital-to-analog converter 11 for a predetermined number of pixels, e.g., three, before the left edge of the auxiliary image and after the right edge. This causes the left and right sides of the border to be formed, as is indicated in FIG. 4. Finally, during a predetermined number (e.g., three) of horizontal lines after the bottom edge of the auxiliary image, border insert multiplexer 7 is caused to couple the border value to the digital-to-analog converter 11 for a predetermined portion of each of the lines corresponding to the width of the auxiliary image plus the width (e.g., 3 pixels) of the left and right sides of the borders. This causes the bottom side of the border to be formed.

It should now be understood that "overlay" multiplexer 15 actually serves to combine the compressed auxiliary video signal plus the border signal with the main video signal. With reference to FIG. 4, note that the duration of the high logic level of the FSW control signal for a horizontal line during which the auxiliary image is being displayed actually corresponds to the width of the auxiliary image plus the widths of the left and right sides of the border. Accordingly, the BORDER INSERT switching control signal is generated in association with the FSW control signal.

Figure 3:
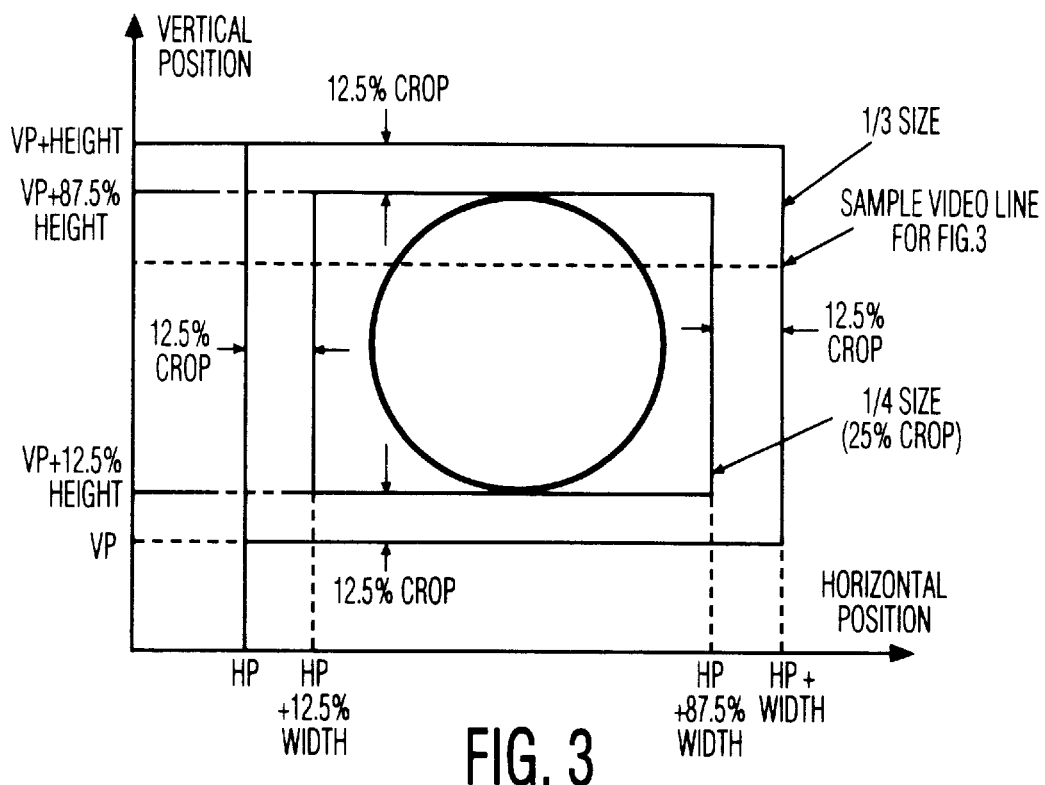
FIG. 3 shows a graphical representation indicating the manner in which the size of an auxiliary image can be reduced in accordance with the invention.

The operation of the PIP processing section to selectively reduce the size of the auxiliary image by cropping a predetermined portion of the auxiliary image will now be described with reference to FIG. 3. FIG. 3 shows an auxiliary image of a predetermined size, for example, 1/3 size, containing a circle, by way of example. To reduce the size of the auxiliary image, for example from 1/3 size to 1/4 size, the auxiliary image is cropped by removing approximately 12.5% of the auxiliary image from both of the left and right sides and both of the top and bottom. This means that an object (e.g. the circle) contained in the auxiliary image has the same size and location for both the 1/3 size and 1/4 size auxiliary images, although less of the auxiliary image is shown.

The cropping is accomplished by controlling the overlay multiplexer 15 to remove an additional number of lines and an additional number of pixels per line from the compressed auxiliary signal. The compressed auxiliary signal is not changed and continues to be generated as in the 1/3 size mode. Viewed another way multiplexer 15 is caused to reduce the time that the compressed auxiliary signal is coupled to display unit 15 instead of the main video signal by changing the duration of the high logic level of the FSW control signal to extend over a time interval corresponding to the region of the auxiliary image which is to be cropped, as is shown in FIG. 4. There is a corresponding change of the BORDER INSERT switching control signal so that the border is inserted in the correct location relative to the cropped auxiliary image, as is also shown in FIG. 4.

Thus, in the exemplary embodiment, the use of the cropping method for reducing the size of the auxiliary image only involves changing two signals. No other signal need be changed. Moreover, in a PIP processing section in which border is not provided, the cropping method only involves changing one signal, the FSW control signal. This method of operation avoids the need for extensive and complicated circuitry because very little is changed in the system in order to accomplish the size reduction.

Figure 5:
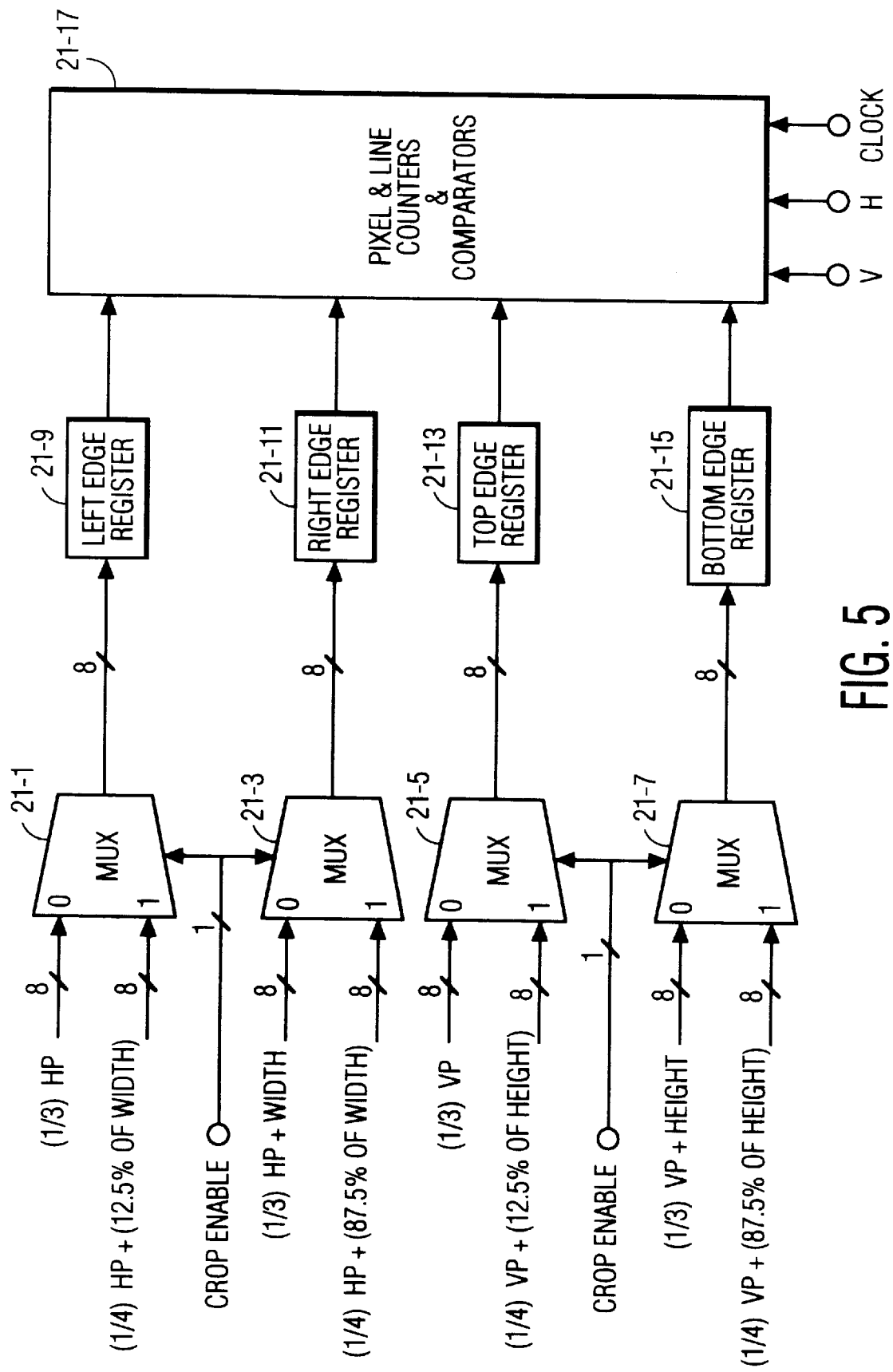
FIG. 5 shows a block diagram of an implementation of a portion of the PIP processing section of the television system shown in FIG. 2 constructed in accordance with the invention.

FIG. 5 shows circuitry for changing the FSW and BORDER INSERT switching control signals for cropping the auxiliary image. Basically, the contents of registers which determine positions of the left and right edges and the top and bottom edges of the auxiliary image are selectively changed in response to the user initiated CROP signal. More specifically, digital words, e.g., including 8 bits, representing the positions of the left, right, top and bottom edges for the two auxiliary image sizes, e.g., 1/3 and 1/4, are coupled to respective inputs of four digital multiplexers 21-1, 21-3, 21-5 and 21-7. For example, in FIG. 5, "HP" represents the position of the left edge of the uncropped 1/3 size auxiliary image and "VP" represents the position of the top edge of the uncropped 1/3 size auxiliary image. Multiplexers 21-1 and 21-3 select the digital values for the positions of the left and right edges, respectively, and multiplexers 21-5 and 21-7 select the digital values for the positions of the top and bottom edges, respectively. The outputs of multiplexers 21-1, 21-3, 21-5 and 21-7 are coupled to respective registers 21-9, 21-11, 21-13 and 21-15. The contents of registers 21-9 and 21-11 represent the positions of the left and right edges of the auxiliary image and therefore also relate to the left and right sides of the border. The contents of registers 21-13 and 21-15 represent the positions of the top and bottom edges of the auxiliary image and therefore also relate to the top and bottom sides of the border. A switching control signal generation unit includes pixel and line counters responsive to the vertical (V) and horizontal (H) synchronization components of the main video signal and a clock signal, and comparators for comparing the contents of registers 21-9 and 21-11 to the pixel count and the content of registers 21-13 and 21-15 to the line count to generate the FSW control signal. The BORDER INSERT switching control signal is generated in a similar way.

In operation, when the uncropped 1/3 size auxiliary image is desired, the CROP control signals is caused to have a low logic level and the digital values representing the positions for left, right, top and bottom edges for the uncropped image are selected and coupled respective ones of registers 21-9, 21-11, 21-13 and 21-15. When the cropped 1/4 size auxiliary image is desired, the CROP control signals is caused to have a high logic level and the digital values representing the positions of the left, right, top and bottom edges for the cropped image are selected and coupled respective ones of registers 21-9, 21-11, 21-13 and 21-15.

While the present invention has been described in terms of a specific embodiment, modifications may occur to those skilled in the art. For example, the not all of the four edge positions needs to be changed to reduce the size of the auxiliary image. This is less desirable in some respects than the specifically disclosed method. If the position of only one edge is changed, the aspect ratio will be changed. If positions of two orthogonal edges is changed, the center of the auxiliary image will be changed. In addition the topology may be modified. For example, an analog level corresponding to the border may be inserted after the compressed auxiliary signal is converted to analog form. These and other modifications are considered to be within the scope of the invention defined by the following claims.

We claim:

1. Apparatus comprising:

means for providing a main video signal corresponding to a main image;

means for providing an auxiliary video signal;

means for compressing said auxiliary video signal by a given compression ratio to produce a compressed auxiliary video signal containing a predetermined number of scanning lines and a number of pixels per scanning line corresponding to an auxiliary image having a first size;

means for combining said main video signal and said compressed auxiliary video signal to produce a combined video signal corresponding to a picture in which said main video image and said auxiliary image are combined;

means for coupling said combined video signal to a display device; and means responsive to a command signal initiated by a user for selectively removing an additional fixed number of lines from said predetermined number of lines of said compressed video signal and an additional fixed number of pixels per line from said predetermined number of pixels per line of said compressed video signal in order to selectively change the area of said auxiliary image from said first area by a fixed amount to a second, fixed smaller area without changing the compression ratio of said compressed auxiliary video signal.

2. The apparatus recited in claim 1, wherein:

said combining means comprises a switching arrangement for selecting either said main video signal or said compressed auxiliary signal in response to a switching control signal; and said selectively removing means comprises means for controlling said switching control signal to remove said additional fixed number of lines and said additional fixed number of pixels per line.

3. The apparatus recited in claim 2 wherein:

said switching control signal generating means comprises means for storing the position of a vertical edge of said auxiliary image; means for storing the position of a horizontal edge of said auxiliary image; means responsive to the contents of said vertical and horizontal edge position storing means for generating said switching control signal; means for selectively loading either a first fixed vertical edge position value or a second fixed vertical edge position value into said vertical edge position storing means; and means for selectively loading either a first fixed horizontal edge position value or a second fixed horizontal edge position value into said horizontal edge position storing means; said first vertical and horizontal edge position values corresponding to said first size of said auxiliary image, and said second vertical and horizontal edge position values corresponding to said second size of said auxiliary image.

4. The apparatus recited in claim 2 wherein:

said switching control signal generating means comprises means for storing the position of a left edge of said auxiliary image; means for storing the position of a right edge of said auxiliary image; means for storing the position of a top edge of said auxiliary image; means for storing the position of a bottom edge of said auxiliary image; means responsive to the contents of said left, right, top and bottom edge position storing means for generating said switching control signal; means for selectively loading either a first fixed left edge position value or a second fixed left edge position value into said left edge position storing means; means for selectively loading either a first fixed right edge position value or a second fixed right edge position value into said right edge position storing means; means for selectively loading either a first fixed top edge position value or a second fixed top edge position value into said top edge position storing means; and means for selectively loading either a first fixed bottom edge position value or a second fixed bottom edge position value into said bottom edge position storing means; said first left, right, top and bottom edge position values corresponding to said first size of said auxiliary image, and said second left, right, top and bottom edge position values corresponding to said second size of said auxiliary image.

5. The apparatus recited in claim 1, further including:

means for generating a border signal corresponding to a border surrounding said auxiliary image; and wherein said first mentioned combining means further includes additional means for combining said compressed auxiliary signal with said border signal to produce an additional combined video signal corresponding to said auxiliary image surrounded by said border; and said first mentioned combining means combines said main video signal and said additional combined video signal to produce said combined video signal.

6. The apparatus recited in claim 5, wherein:

said first mentioned combining means comprises a switching arrangement for selecting either said main video signal or said additional combined video signal in response to a switching control signal; and said selectively removing means comprises means for controlling said switching control signal to remove said additional number of lines and said additional number of pixels per line.

7. The apparatus recited in claim 6, wherein:

said additional combining means comprises an additional switching arrangement for selecting either said border signal generating means or said compressed auxiliary video signal in response to an additional switching control signal; and means for deriving said additional switching control signal in response to said first mentioned switching control signal.

8. Apparatus comprising:

means for providing a main video signal corresponding to a main image;

means for providing an auxiliary video signal;

means for compressing said auxiliary video signal by a given compression ratio to produce a compressed auxiliary video signal containing a predetermined number of scanning lines and a number of pixels per scanning line corresponding to an auxiliary image having a first size;

a switching arrangement for selecting either, said main video signal or said compressed auxiliary signal in response to a switching control signal to combine said main video signal and said compressed auxiliary video signal to produce a combined video signal corresponding to a picture in which said main video image and said auxiliary image are combined;

means for coupling said combined video signal to a display device; and means responsive to a command signal initiated by a user for controlling said switching control signal to selectively remove an additional fixed number of lines from said predetermined number of lines of said compressed video signal and an additional fixed number of pixels per line from said predetermined number of pixels per line of said compressed video signal in order to selectively change the area of said auxiliary image from said first area by a fixed amount to a second, fixed smaller area without changing the compression ratio of said compressed auxiliary video signal;

said switching control signal generating means including means for storing the position of a vertical edge of said auxiliary image; means for storing the position of a horizontal edge of said auxiliary image; means responsive to the contents of said vertical and horizontal edge position storing means for generating said switching control signal; means for selectively loading either a first fixed vertical edge position value or a second fixed vertical edge position value into said vertical edge position storing means; and means for selectively loading either a first fixed horizontal edge position value or a second fixed horizontal edge position value into said horizontal edge position storing means; said first vertical and horizontal edge position values corresponding to said first size of said auxiliary image, and said second vertical and horizontal edge position values corresponding to said second size of said auxiliary image.

9. Apparatus comprising:

means for providing a main video signal corresponding to a main image;

means for providing an auxiliary video signal;

means for compressing said auxiliary video signal by a given compression ratio to produce a compressed auxiliary video signal corresponding to an auxiliary image having a first size;

means for combining said main video signal and said compressed auxiliary video signal to produce a combined video signal corresponding to a picture in which said main video image and said auxiliary image are combined;

means for coupling said combined video signal to a display device; and means responsive to a command signal initiated by a user for selectively causing a fixed amount of said auxiliary image to be cropped in order to selectively change the area of said auxiliary image from said first area by a fixed amount to a second, fixed smaller area without changing the compression ratio of said compressed auxiliary video signal.

10. The apparatus recited in claim 9, wherein:

said cropping means causes said auxiliary image to be cropped both vertically and horizontally.

11. A method for displaying a main image corresponding to a main video signal and an auxiliary image corresponding to an auxiliary video signal comprising the steps of:

compressing said auxiliary video signal by a given compression ratio to produce a compressed auxiliary video signal containing a predetermined number of scanning lines and a number of pixels per scanning line corresponding to an auxiliary image with a first size;

combining said main video signal and said compressed auxiliary video signal to produces a combined video signal corresponding to a picture in which said main video image and said auxiliary image are combined;

coupling said combined video signal to a display device; and selectively removing an additional fixed number of lines from said predetermined number of lines of said compressed video signal and an additional fixed number of pixels per line from said predetermined number of pixels per line of said compressed video signal in response to a command initiated by a user in order to selectively change the area of said auxiliary image from said first area by a fixed amount to a second, fixed smaller area without changing the compression ratio of said compressed auxiliary video signal.

12. The method recited in claim 11, wherein:

said combining step comprises selecting either said main video signal or said compressed auxiliary signal; and said selectively removing step comprises increasing the amount of time said main signal is selected relative to the amount of time said compressed auxiliary signal is selected.

13. The method recited in claim 11 wherein:

said combining step comprises selecting either said main video signal or said compressed auxiliary signal in response to a set of values corresponding to the positions of the vertical and horizontal edges of said auxiliary image; and said selectively removing step comprises selectively changing said edge position values from a first set of fixed values to a second set of fixed values.

14. A method for displaying a main image corresponding to a main video signal and an auxiliary image corresponding to an auxiliary video signal comprising the steps of:

compressing said auxiliary video signal by a given compression ratio to produce a compressed auxiliary video signal containing a predetermined number of scanning lines and a number of pixels per scanning line corresponding to an auxiliary image with a first size;

combining said main video signal and said compressed auxiliary video signal to produces a combined video signal corresponding to a picture in which said main video image and said auxiliary image are combined;

coupling said combined video signal to a display device; and selectively causing a fixed amount of said auxiliary image to be cropped in response to a command initiated by a user in order to selectively change the area of said auxiliary image from said first area by a fixed amount to a second, fixed smaller area without changing the compression ratio of said compressed auxiliary video signal.

15. The method recited in claim 14, wherein:

said auxiliary image is caused to be cropped both vertically and horizontally.

\* \* \* \* \*